United States Patent [19]

Le et al.

[11] Patent Number: 5,226,481
[45] Date of Patent: Jul. 13, 1993

[54] METHOD FOR INCREASING THE STABILITY OF WATER-BASED FRACTURING FLUIDS

[75] Inventors: Hoang V. Le, Houston; William R. Wood, Spring, both of Tex.

[73] Assignee: BJ Services Company, Houston, Tex.

[21] Appl. No.: 846,688

[22] Filed: Mar. 4, 1992

[51] Int. Cl.$^5$ ............................................. E21B 43/26
[52] U.S. Cl. ..................... 166/300; 166/308; 252/8.551
[58] Field of Search ............ 166/271, 294, 295, 300, 166/308; 252/8.551, 315.3; 507/903

[56] References Cited

U.S. PATENT DOCUMENTS

| | | | |
|---|---|---|---|
| 3,000,442 | 9/1961 | Gambill | 252/8.551 X |
| 3,146,200 | 8/1964 | Goldstein et al. | 252/8.551 X |
| 3,215,634 | 11/1965 | Walker | 252/8.551 X |
| 3,974,077 | 8/1976 | Free | 252/8.551 |
| 4,024,073 | 5/1977 | Shimizu et al. | 252/315.3 |
| 4,459,214 | 7/1984 | House et al. | 252/8.551 X |
| 4,568,481 | 2/1986 | Harris, Jr. | 252/315.3 |
| 4,619,776 | 10/1986 | Mondshine | 252/315.3 X |
| 4,679,631 | 7/1987 | Dill et al. | 166/307 |
| 4,683,954 | 8/1987 | Walker et al. | 166/307 |
| 4,721,577 | 1/1988 | Kanda et al. | 252/315.3 X |
| 4,752,404 | 6/1988 | Burns et al. | 252/8.553 |
| 4,928,766 | 5/1990 | Hoskin | 166/295 X |
| 4,968,442 | 11/1990 | Falk | 252/8.551 |
| 4,986,356 | 1/1991 | Lockhart et al. | 166/300 |
| 5,082,579 | 1/1992 | Dawson | 252/8.551 |

*Primary Examiner*—George A. Suchfield
*Attorney, Agent, or Firm*—Charles D. Gunter, Jr.

[57] ABSTRACT

A method for increasing the stability of water-based fracturing fluids is shown in which a base fracturing fluid is formulated by mixing together a hard mix water containing multivalent cations, a water soluble polymer and a cross-linking agent for the water soluble polymer. A water softener is added to the base fracturing fluid which hinders the ability of the multivalent cations present in the hard mix water to compete with the water soluble polymer for borate based cross-linking agent, thereby stabilizing the resulting fracturing fluid.

12 Claims, No Drawings

METHOD FOR INCREASING THE STABILITY OF WATER-BASED FRACTURING FLUIDS

BACKGROUND OF THE INVENTION

1. Field of the Invention

The present invention relates to the stimulating of subterranean formations surrounding oil wells, gas wells and similar bore holes and to an improved fracturing fluid for use in hydraulically fracturing such formations.

2. Description of the Prior Art

The flow of oil from a subterranean formation to a well bore depends upon various factors, such as the permeability of the formation. Often, the permeability of the formation is insufficient to allow a desired flow rate of fluids, such as oil or gas, from the formation. In such cases, the formation can be treated to increase permeability. Hydraulic fracturing is one method of stimulation that increases the yield of oil and gas from subterranean formations.

Commonly, in the field of hydraulic fracturing, a fluid is injected into the formation sought to be fractured through a conduit, such as tubing or casing, disposed in a well bore. The fluid is introduced at a rate and pressure sufficient to produce a fracture in the formation and to extend the produced fracture from the well bore into the formation. The fluid can include a propping agent, which results in placement of the propping agent within the fracture so produced.

At the conclusion of the fracturing treatment, the introduced fluid is recovered from the formation, leaving the proppant behind to prevent the complete closure of the produced fracture, thereby forming a conductive channel extending from the well bore into the formation.

In transporting the proppant (commonly sand) from the surface, down the well bore and into the fractured formation, it is necessary to provide a "stable" fracturing fluid. A stable fracturing fluid is a fluid that exhibits good proppant transport capabilities and which does not lose significant viscosity upon the addition of thermal energy or shear, the fluid also providing acceptable fracture geometry during the fracturing treatment.

Commonly used fracturing fluids are comprised of about 99% by weight potassium chloride solution, with the remaining 1% being a water soluble polymer, a buffer system and a complexor. Traditional complexors used in the industry are borates and the transition metal-oxy complexes such as zirconates and the titanates. While such cross-linkers or complexors are relatively non-problematic in fresh water, stability problems arise when sea water, brine or "hard" water is used as the mix water, achieving less than desirable gel viscosities. It is theorized that these stability problems are due to the presence of multi-valent cations, such as $Ca^{+2}$ and $Mg^{+2}$ which compete with the water soluble polymer for the complexor, producing inefficient complexing and thus poor viscosity enhancement.

One early attempt to overcome the above problem involved the precipitation of the multivalent cations in the mix water as metal carbonates. This procedure, while increasing the stability of the fluid, was less than desirable because the precipitated carbonates tended to cause formation damage and, at the very least, required an acid treatment to re-stimulate production.

A need exists for a method for stimulating a subterranean well using a water-based fracturing fluid which is complexed or cross-linked with commonly available agents and which is not affected by the use of "hard" mix water, such as sea water.

A need also exists for such a method which does not greatly increase the cost of the fracturing treatment. A need also exists for such a method which provides a stable fracturing fluid having adequate proppant transport capabilities and viscosity to provide adequate fractured geometries over a broad temperature range.

SUMMARY OF THE INVENTION

The present method for increasing the stability of water-based fracturing fluids comprises the steps of first formulating a base fracturing fluid from a hard mix water containing multivalent cations, a water soluble polymer and a cross-linking agent for the water soluble polymer. A gel stabilizing amount of a water softener is added to the base fracturing fluid, or to the mix water, the water softener being effective to hinder the ability of the divalent cations present in the hard mix water to compete with the water soluble polymer for the cross-linking agent.

The hard mix water is typically sea water containing $Ca^{+2}$ and $Mg^{+2}$ cations. The preferred cross-linking agent is a source of borate ions. The water soluble polymer is preferably a hydratable polymer selected from the group consisting of guars and derivatized guars, locusted bean gum, karaya gum, xanthan gum, polyvinyl alcohol and mixtures thereof. The water softener is preferably selected from the group consisting of inorganic polyphosphates, amino polycarboxylic acids such as ethylenediaminetetraacetic acid salts of polycarboxylic acids such as citric acid, oxalic acid and lactic acid, polyacrylates, and polyphosphonated chelating salts of agents such as diethylenetriaminepenta (methylenephosphonic acid), salts of nitrilotrimethylenephosphonic acid, salts of ethylenediamine hydroxydiphosphonic acid and salts of ethylenediamine tetramethylene phosphonic acid.

Additional objects, features and advantages will be apparent in the written description which follows.

DETAILED DESCRIPTION OF THE INVENTION

The aqueous-based fracturing fluids of the invention include a base fluid, which is typically fresh water or brine, a hydratable polymer and a complexor or cross-linker. These fluids also typically include a buffer to adjust the pH of the base fluid in order to control the rate of subsequent cross-linking. The present invention concerns the discovery that by "softening" or preventing the divalent cations in a hard mix water, such as those in sea water, from hindering complexation of the polymer that improved fluid stability can be provided over a broad temperature range from about 80° F. to at least about 350° F. Various methods ca be used to "soften" the mix water. These methods include ion exchange, precipitation, and addition of chelating or sequestering agents. As will be described in greater detail, the preferred method involves the use of chelating or sequestering agents. The advantages of using chelating and sequestering agents in borate complexed fluids include the following: the agents provide additional buffer capacity; the agents provide scale inhibition in the proppant pack, formation and the pipe.

In order to practice the method of the invention, an aqueous-based fracturing fluid is first prepared by blending a hydratable polymer into a base fluid. Any suitable mixing apparatus may be used for this procedure. Although the present invention has application to those situations in which a hard potable water source is utilized, it has particular application to those situations in which the mix water is a sea water or brine, such as in offshore locations. Such mix waters have present therein divalent cations, such as $Ca^{+2}$ and $Mg^{+2}$ which can compete with the hydratable polymer for the complexor, thereby producing inefficient complexing.

The hydratable polymers useful for practice of the present invention can be any of the hydratable polysaccharides or hydratable synthetic polymers familiar to those in the well services industry capable of gelling in the presence of borate ions to form a semi solid gel.

For instance, suitable hydratable polysaccharides are the galactomannan gums, glucomannan gums, guars, detrivatized guars and cellulose derivatives. Specific examples are guar gum, guar gum derivatives, locust bean gum, karaya gum. The preferred gelling agents are guar gum, hydroxypropyl guar, and carboxymethylhydroxypropyl guar. A suitable synthetic polymer is polyvinyl alcohol. The most preferred hydratable polymers for the present invention are guar gum and hydroxypropyl guar.

The hydratable polymer is added to the aqueous base fluid in concentrations ranging from about 0.10% to 5.0% by weight of the aqueous fluid. The most preferred range for the present invention is about 0.24% to 0.72% by weight.

Although various cross-linking systems can be utilized in the practice of the invention, the preferred cross-linking system utilizes borate ions. The borate ion source includes boric acid, sodium borate hydrate, calcium borate salts, and the borate, glyoxal complexor described in U.S. patent application of Jeffrey C. Dawson, Ser. No. 465,903, now U.S. Pat. No. 5,082,579 filed Jan. 16, 1990, entitled Method and Composition for Delaying the Gellation of Borated Galactomannans, the disclosure of which is incorporated herein by reference.

The concentration of borate ion ranges from $7.5 \times 10^{-4}M$ to $3 \times 10^{-2}M$. Preferably from $1 \times 10^{-3}$ to $7 \times 10^{-3}M$.

Propping agents are typically added to the base fluid prior to the addition of the complexor. Propping agents include, for instance, quartz sand grains, glass and ceramic beads, walnut shell fragments, aluminum pellets, nylon pellets, and the like. The propping agents are normally used in concentrations between about 1 to 8 pounds per gallon of fracturing fluid composition, but higher or lower concentrations can be used as required. The base fluid can also contain other conventional additives common to the well surfaces industry such as surfactants, corrosion inhibitors, buffers, and the like.

In addition to the mix water, hydratable polymer and complexor, the fracturing fluids of the present invention also employ a gel stabilizing amount of a water softener for the "hard" mix water. For purposes of this invention, a "hard" mix water will be taken to mean a mix water having in excess of about 1000 ppm total dissolved solids in terms of $CaCO_3$ equivalents. The usual field conditions encountered will involve "hard" mix water having greater than about 3000 ppm total dissolved solids, for example, 3000 to 7000 ppm. A "gel stabilizing amount" of water softener will be taken to mean that amount of gel stabilizer necessary to bring the free, uncomplexed multivalent ions to concentrations less than about 3000 ppm, in some cases as low as 1000 ppm $CaCO_3$ equivalents and below.

The preferred water softeners operate as chelating or sequestering agents and are selected from the group consisting of salts of inorganic polyphosphates, amino polycarboxylic acids such as ethylenediaminetetraacetic acid, polyacrylates, salts of typical phosphonate scale inhibitors such as diethylenetriaminepenta(methylenephosphonic acid), salts of nitrilotrimethylenephosphonic acid, ethylene diamine tetramethylene phosphonic acid and ethylenediamine hydroxy diphosphonic acid. A particularly preferred water softener is diethylenetriaminepenta(methylenephosphonic acid), sodium salt.

A typical fracturing treatment would be conducted by hydrating a 0.24 to 0.72% galactomannan based polymer, such as a guar, in a 2% (wt/vol) KCl solution at a pH ranging from about 5.0 to 8.5. The mix water can be a "hard" mix water which is softened to below about 3000 ppm total hardness, calculated as $CaCO_3$, by the addition of a chelating or sequestering agent, as previously described. During actual pumping, a buffer would be added to increase the hydrated polymer pH to above 8.0, followed by addition of the borate complexor, and typically a breaker and proppant.

The following non-limiting examples illustrate the advantage of using a water softener with a borate complexed water-based fracturing fluid.

EXAMPLE #1

A fluid was prepared with 4.80 grams Guar gum in 1000 ml of sea water obtained from the North Sea. The water had a total hardness calculated as $CaCO_3$ to be 6412 ppm (see water composition on Table #1). 12.0 milliliters of 1.27M NaOH was used to bring the solution pH to 11.38. Then, 0.706 grams of Sodium Borate Decahydrate were added, and a viscous gel instantly resulted requiring high shear to assure homogeneity. The viscosity was measured with a Fann 50C viscometer equipped with R1B1 rotor/bob. The gel was heated to 225° F. in a preset bath and pressured to 110 psi. At 75° F. an initial rate sweep using 170, 102, 85, and 42 $sec^{-1}$ was performed and repeated every 30 minutes while heating. The interim rate between sweeps was 102 $sec^{-1}$. The test continued for 137 minutes. The power law indices n' and K were determined from the plot of log stress vs log rate, as described in the API's RP-39Manual. The apparent viscosities were then calculated at several rates using these power law indices.

EXAMPLE #2

Results from further experiments are shown in Table 2. The test was conducted to observe the effect of water softening on gel viscosity using Diethylenetriaminepenta(methylenephosphonic acid) (DETAPM PA), sodium salt to chelate the cations in sea was used to soften the seawater, which increased the stability of the fluid.

EXAMPLE #3

The test and fluid composition in this example were identical to those in Examples 1 and 2, except the test temperature was lowered to 180° F. and the sodium borate was replaced with 1.090 grams of boric acid. Results of this experiment are shown in Tables 3 and 4.

EXAMPLE #4

The test and fluid composition were identical to those in Examples #1 and #2, except the test temperature was 180° F. and the total hardness of the sea water was lower (4784 ppm). The sea water was Beaufort Seawater and its composition is shown in Table #5. The total hardness calculated as CaCO3 is 4784 ppm, which required a lower concentration of DETAPM PA. Results of this experiment are shown in Tables 5 and 6.

EXAMPLE #5

In this experiment, the water softening agent used was ethylenediaminetetraacetic acid, tetrasodium salt dihydrate, and the test temperature was 225° F. All the other test conditions were identical to those in Examples 1 and 2. Results of this experiment are shown in Tables 7 and 8.

TABLE 1
BORATE CROSSLINKED GUAR GUM

Seawater Analysis:
Hard water: Total hardness as CaCO3: 6412 ppm
Water contained:
+9911 ppm Sodium ion
+311 ppm Calcium ion
+1368 ppm Magnesium ion
+1408 ppm Potassium ion
+19417 ppm Chloride ion
+2233 ppm Sulfate ion
+166 ppm Carbonate ion The fluid composition: per 1.0 liter of Hard water
4.80 g Guar gum
12.0 ml of 1.27 M NaOH
0.706 g Sodium Borate decahydrate

| Time Min | Temp °F. | $n'$ | $K'$ (lbf-sec$^{n'}$/ft$^2$) | 170 sec$^{-1}$ | 100 sec$^{-1}$ | 40 sec$^{-1}$ |
|---|---|---|---|---|---|---|
| 18 | 225 | 1.088 | .0003 | 23 | 22 | 20 |
| 48 | 229 | 2.745 | .0000 | 0 | 0 | 0 |
| 78 | 229 | 1.409 | .0000 | 14 | 11 | 8 |
| 108 | 229 | 1.721 | .0000 | 15 | 10 | 5 |
| 138 | 229 | 1.151 | .0000 | 14 | 13 | 12 |

TABLE 2
BORATE CROSSLINKED GUAR GUM

Additives:
Hard water: Total hardness as CaCO3: 6412 ppm
Water contained: As same as Table 1
The fluid composition: per 1.0 liter of Hard water
4.80 g Guar gum
12.0 ml of 1.0 M
Diethylenetriaminepenta(methylenephosphonic acid) sodium salt
12.0 ml of 1.27 M NaOH
0.706 g Sodium Borate decahydrate

| Time Min | Temp °F. | $n'$ | $K'$ (lbf-sec$^{n'}$/ft$^2$) | 170 sec$^{-1}$ | 100 sec$^{-1}$ | 40 sec$^{-1}$ |
|---|---|---|---|---|---|---|
| 17 | 226 | .7450 | .0323 | 418 | 479 | 605 |
| 47 | 222 | 1.1690 | .0044 | 511 | 467 | 400 |
| 77 | 223 | 1.4444 | .0009 | 452 | 357 | 238 |
| 107 | 224 | 1.5520 | .0005 | 410 | 306 | 184 |
| 137 | 224 | 1.4810 | .0006 | 360 | 279 | 179 |

TABLE 3
BORATE CROSSLINKED GUAR GUM

Additives:
Hard water: Total hardness as CaCO3: 6418 ppm
Water contained:
+ As same as Table 1
The fluid composition: per 1.0 liter of Hard water
4.80 g Guar gum
12.0 ml of 1.27 M NaOH
1.290 g Boric acid

TABLE 3-continued
BORATE CROSSLINKED GUAR GUM

| Time Min | Temp °F. | $n'$ | $K'$ (lbf-sec$^{n'}$/ft$^2$) | 170 sec$^{-1}$ | 100 sec$^{-1}$ | 40 sec$^{-1}$ |
|---|---|---|---|---|---|---|
| 17 | 181 | .641 | .0057 | 43 | 53 | 73 |
| 47 | 184 | .476 | .0058 | 19 | 25 | 40 |
| 77 | 185 | 1.338 | .0000 | 23 | 19 | 14 |
| 107 | 185 | 1.355 | .0000 | 22 | 18 | 13 |
| 137 | 185 | .730 | .0016 | 20 | 23 | 30 |
| 167 | 185 | .690 | .0025 | 24 | 29 | 38 |
| 197 | 185 | .715 | .0019 | 22 | 26 | 33 |

TABLE 4
BORATE CROSSLINKED GUAR GUM

Additives:
Hard water: Total hardness as CaCO3: 6418 ppm
Water contained:
+ As same as Table 1
The fluid composition: per 1.0 liter of Hard water
4.80 g Guar gum
12.0 ml of 1.0 M
Diethylenetriaminepenta(methylenephosphonic acid) sodium salt
12.0 ml of 1.27 M NaOH
1.090 g Boric acid

| Time Min | Temp °F. | $n'$ | $K'$ (lbf-sec$^{n'}$/ft$^2$) | 170 sec$^{-1}$ | 100 sec$^{-1}$ | 40 sec$^{-1}$ |
|---|---|---|---|---|---|---|
| 17 | 176 | .3650 | .2801 | 514 | 720 | 1289 |
| 47 | 179 | .3840 | .2324 | 470 | 652 | 1147 |
| 77 | 179 | .3900 | .2171 | 453 | 627 | 1096 |
| 107 | 180 | .2970 | .3013 | 390 | 567 | 1079 |
| 137 | 180 | .3540 | .2112 | 366 | 516 | 933 |
| 167 | 181 | .3480 | .2226 | 375 | 529 | 962 |
| 197 | 181 | .3330 | .2478 | 386 | 550 | 1013 |

TABLE 5
BORATE CROSSLINKED GUAR GUM

Additives:
Hard water: Total hardness as CaCO3: 4736 ppm
Water contained:
+8080 ppm Sodium
+313 ppm Calcium
+972 ppm Magnesium
+312 ppm Potassium
+1 ppm Iron
+15024 ppm Chloride
+1463 ppm Carbonate
+131 ppm Bicarbonate
The fluid composition: per 1.0 liter of Hard water
4.80 g Guar gum
12.0 ml of 1.27 M NaOH
0.706 g Sodium Borate decahydrate

| Time Min | Temp °F. | $n'$ | $K'$ (lbf-sec$^{n'}$/ft$^2$) | 170 sec$^{-1}$ | 100 sec$^{-1}$ | 40 sec$^{-1}$ |
|---|---|---|---|---|---|---|
| 18 | 182 | .769 | .0144 | 212 | 239 | 296 |
| 48 | 184 | 2.017 | .0000 | 135 | 79 | 31 |
| 78 | 184 | 1.622 | .0001 | 128 | 92 | 52 |
| 108 | 183 | 1.591 | .0001 | 145 | 106 | 62 |
| 138 | 183 | 1.510 | .0002 | 151 | 115 | 72 |
| 168 | 183 | 1.408 | .0003 | 139 | 112 | 77 |
| 198 | 184 | 1.485 | .0002 | 139 | 108 | 69 |

TABLE 6
BORATE CROSSLINKED GUAR GUM

Additives:
Hard water: Total hardness as CaCO3: 4736 ppm
Water contained: As same as Table 5
The fluid composition: per 1.0 liter of Hard water

TABLE 6-continued

BORATE CROSSLINKED GUAR GUM

4.80 g Guar gum
7.0 ml of 1.0 M Diethylenetriaminepenta(methylenephosphonic acid) sodium salt
12.0 ml of 1.27 M NaOH
0.706 g Sodium borate decahydrate

| Time Min | Temp °F. | n' | K' (lbf-sec$^{n'}$/ft$^2$) | 170 sec$^{-1}$ | 100 sec$^{-1}$ | 40 sec$^{-1}$ |
|---|---|---|---|---|---|---|
| 17  | 182 | .3790 | .1813 | 358 | 497 | 879  |
| 47  | 181 | .3960 | .1838 | 396 | 545 | 948  |
| 77  | 181 | .3870 | .2342 | 481 | 667 | 1169 |
| 107 | 182 | .4170 | .1932 | 463 | 631 | 1077 |
| 137 | 182 | .4340 | .1797 | 470 | 635 | 1067 |
| 167 | 182 | .4390 | .1723 | 463 | 623 | 1041 |
| 197 | 182 | .4570 | .1567 | 461 | 615 | 1012 |

TABLE 7

BORATE CROSSLINKED GUAR GUM

Additives:
Hard water: Total hardness as CaCO3: 4736 ppm
+ solution contained: As same as Table 5
The fluid composition: per 1.0 liter of Hard water
4.80 g Guar gum
12.0 ml of 1.27 M NaOH
0.706 g Sodium Borate decahydrate

| Time Min | Temp °F. | n' | K' (lbf-sec$^{n'}$/ft$^2$) | 170 sec$^{-1}$ | 100 sec$^{-1}$ | 40 sec$^{-1}$ |
|---|---|---|---|---|---|---|
| 18  | 25  | 2.174 | .0000 | 29 | 16 | 5  |
| 48  | 226 | 1.362 | .0001 | 32 | 27 | 19 |
| 78  | 229 | 1.149 | .0000 | 6  | 5  | 5  |
| 108 | 226 | 1.502 | .0000 | 6  | 5  | 3  |
| 130 | 226 | 1.897 | .0000 | 11 | 7  | 3  |
| 168 | 226 | .239  | .0006 | 6  | 10 | 19 |
| 198 | 224 | 1.427 | .0000 | 12 | 10 | 6  |

TABLE 8

BORATE CROSSLINKED GUAR GUM

Additives:
Hard water: Total hardness as CaCO3: 4784 ppm
+ Water contained: As same as Table 5
The fluid composition: per 1.0 liter of Hard water
4.80 g Guar gum
10.0 ml of 1.0 M Ethylenediaminetetraacetic acid, tetrasodium salt dihydrate.
12.0 ml of 1.27 M NaOH
0.706 g Sodium Borate decahydrate

| Time Min | Temp °F. | n' | K' (lbf-sec$^{n'}$/ft$^2$) | 170 sec$^{-1}$ | 100 sec$^{-1}$ | 40 sec$^{-1}$ |
|---|---|---|---|---|---|---|
| 17  | 226 | .5050  | .0656 | 247 | 322 | 506 |
| 47  | 223 | .7530  | .0179 | 241 | 275 | 345 |
| 77  | 223 | 1.0360 | .0043 | 251 | 247 | 239 |
| 107 | 224 | 1.1380 | .0026 | 261 | 243 | 214 |
| 137 | 226 | 1.4700 | .0004 | 267 | 208 | 135 |
| 167 | 226 | 1.5890 | .0002 | 282 | 207 | 120 |
| 197 | 219 | 1.3960 | .0008 | 318 | 258 | 180 |

An invention has been provided with several advantages. By softening or preventing the multivalent cations in the mix water from hindering complexation of the water-based polymer, the stability of the water-based fracturing fluid is greatly improved. The resulting fluid exhibits good proppant transport capabilities, does not lose significant viscosity upon the addition of thermal energy or shear and, during the fracturing treatment, provides a good fracture geometry.

While the invention has been shown in only two of its forms, it is not thus limited but is susceptible to various changes and modifications without departing from the spirit thereof.

What is claimed is:

1. A method for increasing the stability of water based fracturing fluids of the type used to fracture oil and gas wells, the method comprising the steps of:
   formulating a base fracturing fluid from a hard mix water containing multivalent cations, a water soluble polymer and a borate based cross-linking agent for the water soluble polymer;
   incorporating into a selected one of the hard mix water and base fracturing fluid a gel stabilizing amount of a water softener effective to hinder the ability of the multivalent cations present in the hard mix water to compete with the water soluble polymer for the cross-linking agent.

2. The method of claim 1, wherein the hard mix water is seawater containing $Ca^{+2}$ cations.

3. The method of claim 1, wherein the hard mix water is seawater containing $Mg^{+2}$ cations.

4. The method of claim 3, wherein the water soluble polymer is selected from the group consisting of guar gum, guar gum derivatives, locust bean gum, karaya gum, polyvinyl alcohol, and mixtures thereof.

5. The method of claim 4, wherein the water softener is selected from the group consisting of inorganic polyphosphates, salts of amino polycarboxylic acids, polyacrylates and salts of phosphonate scale inhibitors.

6. The method of claim 5, wherein the salts of phosphonate scale inhibitors are selected from the group consisting of salts of diethylenetriaminepenta (methylenephosphonic acid), salts of nitrilotrimethylenephosphonic acid, salts of ethylenediamine hydroxydiphosphonic acid and salts of ethylenediamine tetramethylene phosphonic acid.

7. The method of claim 5, wherein the salts of phosphonate scale inhibitors are selected from the group consisting of salts of ethylenediaminetetramethylene phosphonic acid, and salts of ethylidenehydroxy diphosphonic acid.

8. A method of fracturing a subterranean formation comprising the steps of:
   blending together a base fracturing fluid from a hard mix water containing divalent cations, a hydratable polymer capable of gelling in the presence of borate ions, thereby forming a base fluid;
   allowing the polymer to hydrate to form a hydrated base fluid;
   forming a complexor solution for the base fluid which includes a cross-linking additive capable of furnishing borate ions in solution;
   introducing a combination of the base fluid from the complexor solution or the base fluid followed by the complexor solution into the subterranean foundation for fracturing the subterranean foundation; and
   wherein a selected one of the hard mix water and base fracturing fluid has incorporated herein a gel stabilizing amount of a water softener effective to hinder the ability of the divalent cations present in the hard mix water from competing with the water soluble polymer for the cross-linking agent.

9. The method of claim 8, wherein the hard mix water is seawater containing $Ca^{+2}$ cations.

10. The method of claim 8, wherein the hard mix water is seawater containing $Mg^{+2}$ cations.

11. The method of claim 8, wherein the hydratable polymer is selected from the group consisting of guar gum, guar gum derivatives, locust bean gum, karaya gum, polyvinyl alcohol, and mixtures thereof.

12. The method of claim 8, wherein the water softener is selected from the group consisting of inorganic polyphosphates, salts of amino polycarboxylic acids, polyacrylates and salts of diethylenetriaminepenta (methylenephosphonic acid), salts of nitrilotrimethylenephosphonic acid, salts of ethylenediamine hydroxydiphosphonic acid and salts of ethylenediamine tetramethylene phosphonic acid.

* * * * *